United States Patent Office 2,926,634
Patented Mar. 1, 1960

2,926,634

FLOW CONTROL VALVE

Eugene L. Falendysz, St. Clair Shores, and Rodger T. Lovrenich, Detroit, Mich., assignors to Sherman Products, Inc., Royal Oak, Mich., a corporation of Michigan Application July 18, 1958, Serial No. 749,545

3 Claims. (Cl. 121—40)

The present invention relates to a flow control valve and more particularly to a valve for correlating input and output flow of hydraulic fluid in a two component fluid pressure actuating system.

In the control of egress and ingress fluid flow in a two component fluid pressure system, as for example between a pair of single acting cylinders or between the reverse ends of a double acting cylinder, it is necessary to closely correlate the pressure flow of fluid at both sides of the system to prevent cavitation and slackness in the two fluid columns. Numerous attempts have been made to control pressure flow by the use of cooperating single element valves, but prior to the present invention no satisfactory, broadly applicable solution has been attained.

The invention proposes the use of two identical, multi-element valve means interposed between a control valve and a two component actuating mechanism, such as a pair of oppositely operable single acting cylinders. The two valve means preferably are identical and each consists of a tubular sleeve valve cooperable with a first seat and having an internal seat, and a poppet valve movable within the sleeve and having a valve surface cooperable with the interior valve seat of the sleeve. The sealing or seating surfaces of both valve elements are interposed between an inlet line leading, for example, from a control valve of suitable type, and an ingress-egress line connected to one of the components of the actuating mechanism. Inasmuch as the valves are used in pairs, one such valve is provided for each component of the actuating mechanism. The valve sleeve is operable in response to fluid pressure from the control valve or the like to admit fluid under pressure from the control valve to the corresponding actuating component. The poppet valve is balanced with respect to any differential pressures acting thereupon and is operable by an extraneous actuating mechanism to control the egress of fluid from the corresponding actuating component through the inlet opening to the control valve and hence to a sump.

The extraneous poppet-actuating means preferably comprises a fluid pressure actuated piston exposed to sleeve-actuating inlet pressure on one of the pair of valve means for actuating the poppet of the other valve means. By correlating the pressures at which the extraneous actuating means is actuated with reference to the actuating pressure for the inlet sleeve, it is possible to eliminate any slackness or cavitation in the actuating mechanism. By hydraulically balancing the poppet, the back pressure generated by egress fluid flow has no effect upon the actuation of the poppet valve and the poppet is operated solely under the control of the extraneous actuating means.

If desired, internal pressure fluid circulation can be obtained by the utilization of a pair of novel relief valves operable to interchange fluid under pressure between the components of the actuating mechanism even when the poppet valve and sleeves have been closed, thus compensating for any residual or inertial forces to which the actuating mechanism may be subjected.

It is therefore an important object of the present invention to provide an improved fluid control valve for use in multi-component fluid pressure systems.

Another object of this invention is the provision of a novel flow control cushioning valve wherein multi-element valves are utilized to control ingress and egress of pressure fluid to and from a multi-component system.

It is yet another important object to provide a fluid flow control valve for a multi-component fluid pressure actuating system wherein back pressure from any component of the system is ineffective to vary the operating characteristics thereof.

Still another object of this invention is the provision of a flow control cushioning valve wherein circulatory flow in a multi-component system is effected internally of the system to compensate for residual or inertial forces existing therein after interruption of normal actuating pressures thereon.

Other objects and advantages of the invention will appear from the following detailed description taken in conjunction with annexed drawings, in which:

Figure 1:
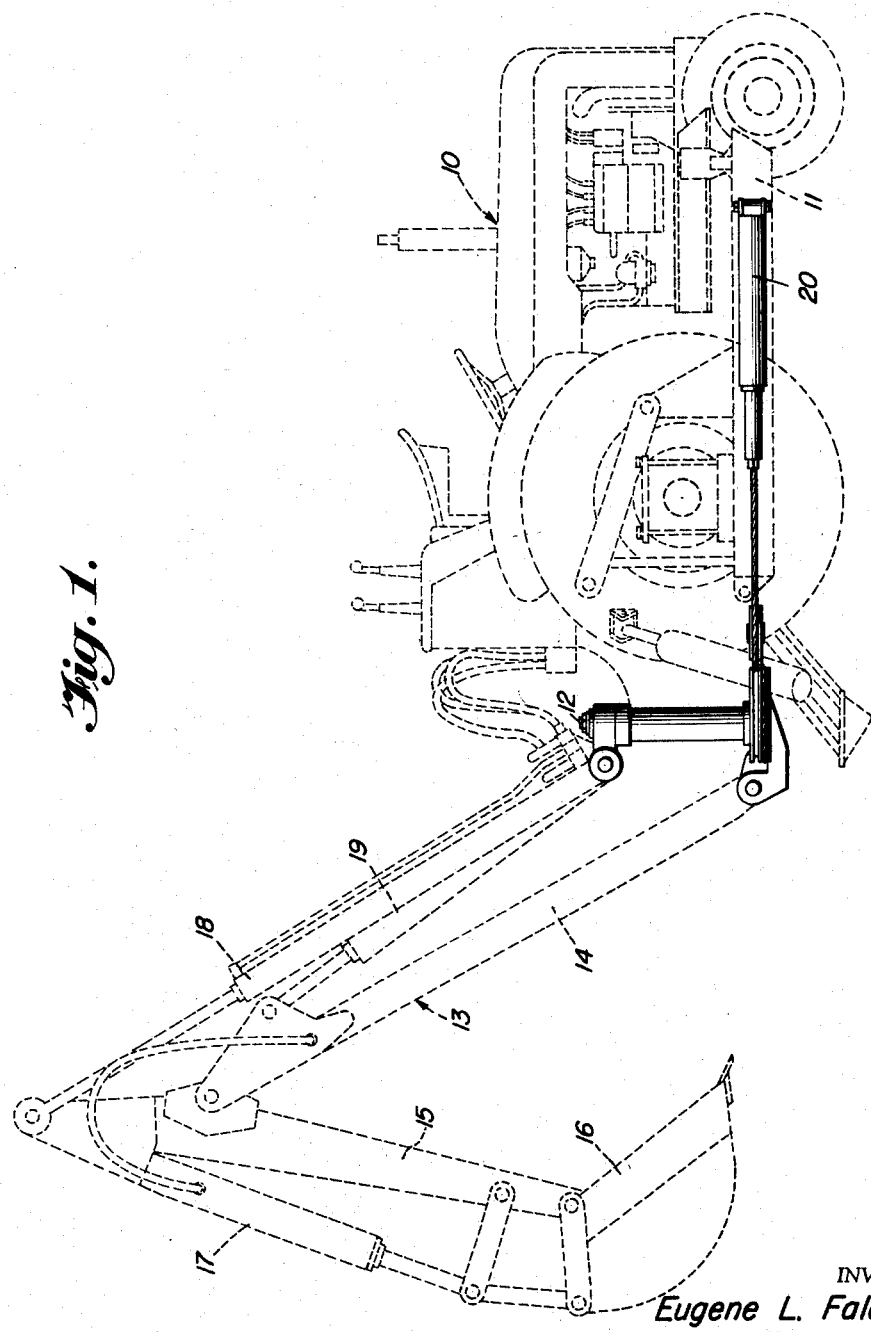
Figure 1 is an elevational view illustrating in dotted outline a tractor and digger combination unit incorporating a multi-component fluid pressure actuated system provided with a flow control valve of the present invention.

In Figure 1, reference numeral 10 refers generally to a prime mover, such as a tractor, carrying a frame including a pair of side rails 11, this main frame supporting a vertically extending pivot post 12. Connected to the pivot post 12 for vertical swinging movement thereabout is a digger indicated generally at 13 and including a boom 14 carrying at its rear end a generally vertically extending dip stick 15. The lower end of this dip stick 15 has pivotally secured thereto a digging bucket 16. The digger is hydraulically actuated, as by bucket cylinder 17, dip stick cylinder 18 and boom cylinder 19.

Figure 2:
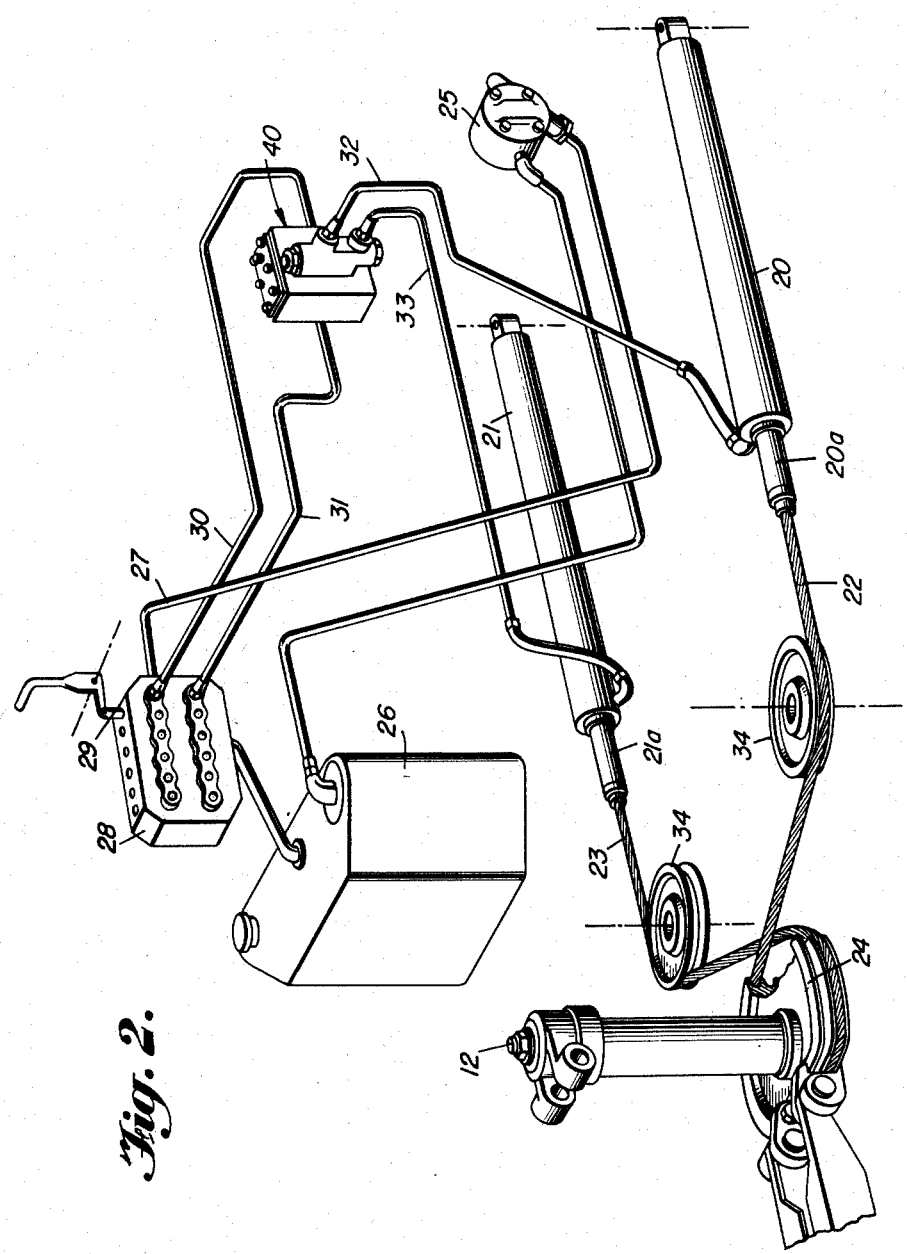
Figure 2 is a fragmentary schematic illustration of the multi-component actuating mechanism in which a valve of the present invention is utilized.

This invention is concerned primarily with the pivot post 12 and the mechanism for actuating the elements of digger 13 about the pivot post 12. Specifically, this invention is concerned with means hydraulically controlling the operation of a pair of single acting cylinders 20 and 21 which are secured to the side rails 11 and which have their extensible and retractible piston rods 20a and 21a connected, respectively, to cables or the like flexible force transmitting elements 22 and 23, as best shown in Figure 2. The cables 22 and 23 are secured to and partially lapped about a double sheave 24 rotatable with the pivot post 12, so that actuation of the cylinder 21 to retract its piston rod 21a will tension the cable 23 and rotate the sheave 24 in a counter-clockwise direction (as viewed in Figure 2). Obviously, actuation of the cylinders 20 will tension the cable 22 to move the sheave 24 in the opposite direction, i.e., in a clock-wise direction.

The cylinders 20 and 21 are actuated by a hydraulic system including a pump 25 receiving fluid from a sump 26 and discharging through a line 27 to a manually actuable control valve assembly 28. This control valve assembly 28 comprises a plurality of manually actuatable valves, including a reversible valve 29 for directing fluid under pressure from a pump 25 through either of the lines 30 and 31 to a flow control cushioning valve 40 of the present invention. This flow control cushioning valve 40 then directs fluid under pressure to one or the other of the cylinders 20 and 21 through lines 32 and 33, respectively.

Assuming that fluid under pressure is directed by the valve 40 to the cylinder 20 through line 32, return fluid flow must be accommodated from the cylinder 21 to the sump 26 in order that movement of the sheave 24 may not be prevented by the entrapment of fluid in the forward end of the cylinder 21. This flow occurs through the line 33, the cushioning valve 40, the line 31, and the valve block 28 to the sump 26.

Inasmuch as cylinders 20 and 21 are single acting and operate only through the tension cables 22 and 23, it is essential that tension be maintained in the cables at all times to prevent their displacement from the sheave 24 and/or from the idler sheaves 34. This problem of maintaining tension in the cables at all times becomes particularly pressing when the digger is operating upon a hillside, and wherein the normal inertial loads within the digger are multiplied by the gravitational load of the bucket and its contents, the boom, and the dip stick.

Figure 3:
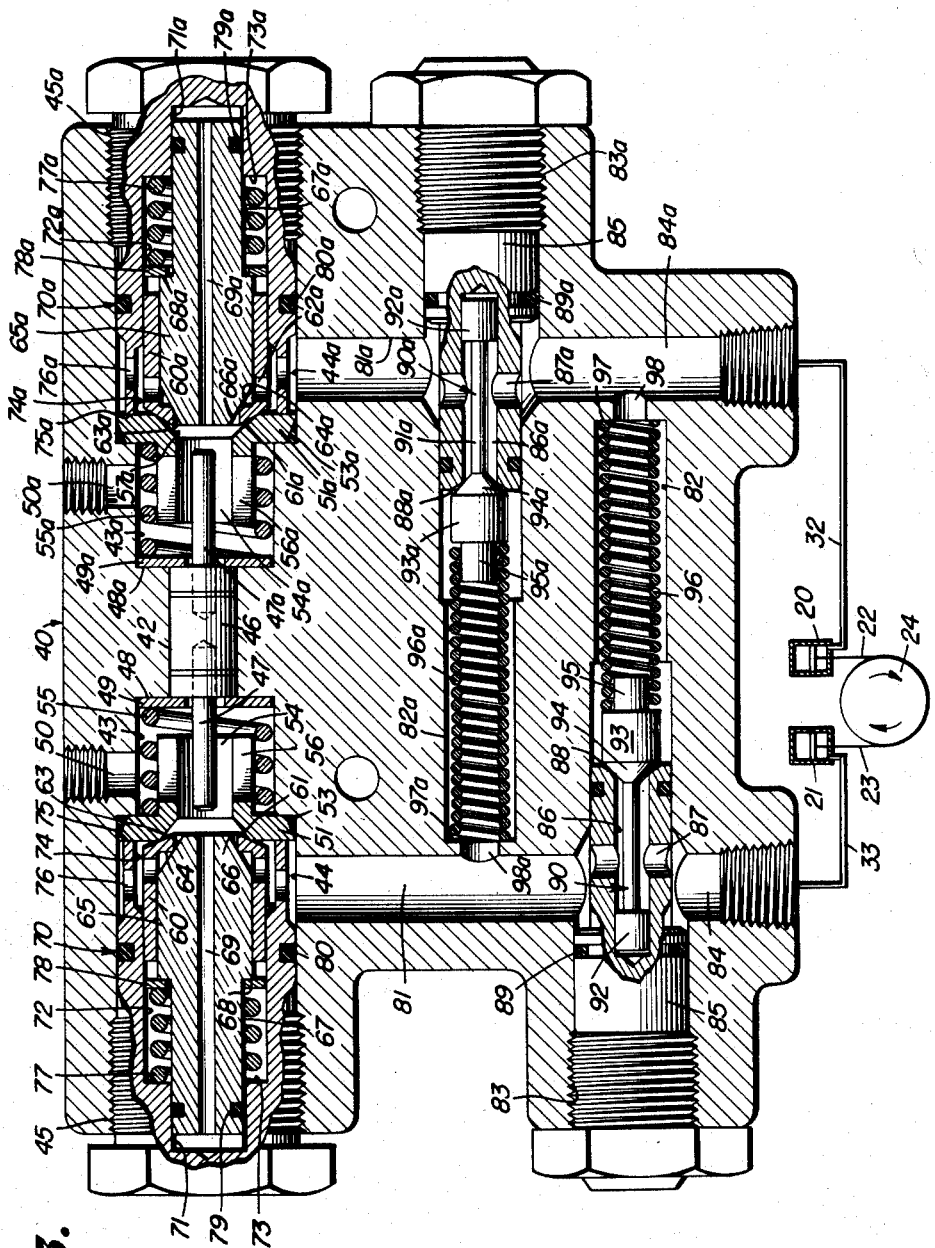
Figure 3 is a vertical sectional view, on an enlarged scale, of a flow control valve of the present invention.
Figure 4:
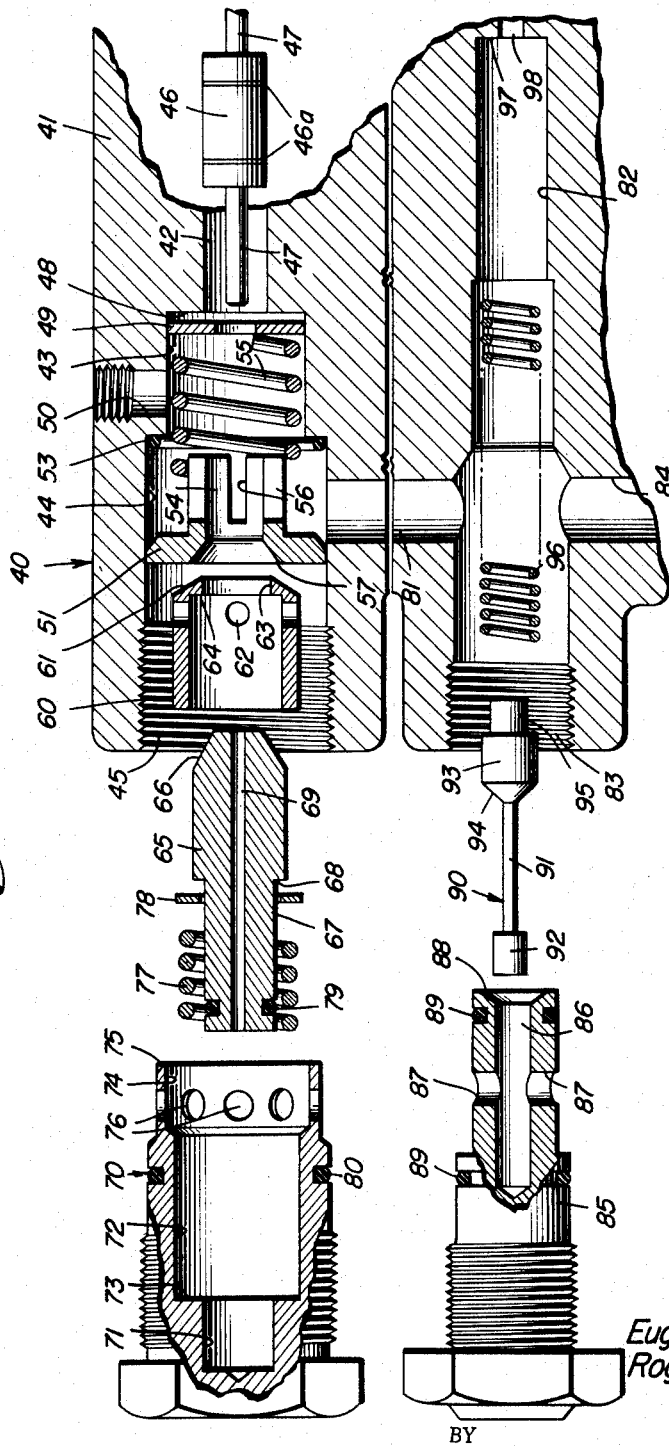
Figure 4 is an exploded sectional view similar to Figure 3.

The accurate control of the cylinders 20 and 21 and the correlation of their action to effectively move the sheave 24 and to accurately maintain tension within the cables 22 and 23 is accomplished through the fluid flow control cushioning valve 40 illustrated in detail in Figures 3 and 4.

The valve 40 comprises actually a multiplicity of valve elements enclosed within a single casing or housing 41.

The entire valve structure 40 is symmetric about a medial vertical plane. Since this symmetry is obvious, all the valve elements to the left of this plane are referred to by primary reference numerals, while the identical reference numerals with an added suffix "a" refer to all valve elements to the right of this medial plane. For simplicity of disclosure, only primary reference numerals are used in the description of the valve structure, it being understood that an identical structure exists on each side of the medial plane.

This casing 41 includes a central relatively short piston bore 42 open at both ends to merge with a pair of spaced inlet chambers 43. The inlet chambers 43 each merge with an outer, radially enlarged outlet chamber 44 extending to the lateral extremities of the case and each having internal threads 45 therein for securing the various valve elements, as hereinafter described.

Disposed within the central piston chamber is a poppet-actuating piston 46 from each axial extremity of which projects an actuating rod 47. Disposed within the inlet chambers 43 and abutting the radial shoulder 48 defined between the chambers 42 and 43 is a washer 49. The length of the piston chamber 42 is substantially the same as the length of the piston 46 and the piston is provided with oil grooves sealing the piston 46 within its chamber 42. The actuating rods 47 project into the inlet chambers 43 through the central washer aperture and the piston axial extremities about the washers 49. Opening into the inlet chambers 43 are inlet lines 30, 31 as best shown in Figure 2.

An inlet seat insert 51 is positioned in the enlarged chamber 44 to be bottomed against the shoulder 52 defined between the chambers 43 and 44. A seal element 53 of suitable type, such as O ring 53, abuts the chamfered periphery of the element 51 to seal the chamber 43 from the chamber 44. The insert 51 is provided with an axial extension 54 projecting into the chamber 43 and providing a center guide for a coil compression spring 55 urging the associated washer 49 against the shoulder 48. The springs 55 thus serve to center the piston 46 within the piston chamber. The axial extension 54 of the insert 51 is provided with fluid passage slots 56, so as to accommodate flow of fluid from the inlet opening 50 axially of the insert 51.

The insert 51 is provided with an internal annular valve seat 57 which is generally conical in outline and fluid must pass this valve seat 57 in order to flow from the inlet opening 50 through the chamber 43 into the chamber 44.

Cooperating with the seat 57 is a tubular valve sleeve 60 having a frusto-conical valve face 61 at its forward end cooperable with the valve seat 57 of the element 51. The sleeve 60 is provided with a plurality of radial fluid flow ports 62 and with a centrally located axial port 63 immediately adjacent the sealing face 61.

Disposed within the sleeve 60 is an elongated poppet 65 having a conical leading or nose face 66 cooperable with the sleeve aperture 63 to seal the interior of the sleeve 60 from fluid within the chamber 43. It will be noted that the internal valve seat of the sleeve 60 is provided by the shoulder 64 defined at the apertures 63, and the conical edge or nose 66 of the poppet 65 will effectively seal against the edge of this shoulder 64.

The poppet 65 is axially elongated to project beyond the confines of the sleeve 60 and is provided with a reduced rear terminal portion 67 cooperating with the main body of the poppet to define a radial shoulder 68. The poppet also has an axially extending bore 69 through which free fluid flow from the chamber 43 can occur.

The various valve elements are retained in the chambers 42, 43 and 44 by an exteriorly threaded lug 70 counter-bored from its inner end to define a relatively small outer chamber 71, a relatively enlarged intermediate chamber 72 joined to the outer chamber 71 by a radial wall 73 and a still further radially enlarged inner chamber 74 terminating in a free edge 75 and having radial fluid flow ports 76 therein. The several plug bores receive the poppet 65 and the sleeve 60 therein, the poppet being spring biased toward the central piston chamber 42 by a coil compression spring 77 bottomed on the plug shoulders 73 and acting against an annular washer 78 which is bottomed against the poppet shoulders 68. The terminal surface 75 of the plug confines the inlet seat insert 51 against the shoulder 52 and the seal 53, and abutment of the conical face 66 of the poppet 65 with the shoulder 64 of the sleeve 60 urges the sleeve face 61 against its seat 57.

It will be noted that a peripheral seal 79 is provided at the rear end of the reduced portion 67 of the poppet to seal against the terminal recess 71 of the plug 70 and a second peripheral seal 80 seals the plug 70 into the valve body 44.

An outlet opening 81 communicates with the outlet space 44 and establishes communication between the space 44 and an elongated relief valve passage 82 which is axially aligned with the radially enlarged relief plug bore 83. The recess 82 lies axially parallel to the aligned passages 42, 43 and 44 generally therebeneath. A lower outlet port 84 communicates with the actuating mechanism line 33. A second such port 84a communicates with the actuating mechanism line 32.

Disposed within a terminal threaded portion 83 of passage 82 is an externally threaded plug 85 having an axially extending recess 86 formed therein, this recess communicating with a cross bore 87 extending radially through the plug and generally aligned with the outlet passages 81—84. The plug 85 terminates in a frusto-conical relief valve seat 88 at the free inner end of the plug, and a peripheral seal ring 89 is provided on the plug for sealing the same into the threaded bore portion 83.

A relief valve plunger 90 is provided with an elongated reduced central portion 91 extensible into the recess 86 of the plug and has a radially enlarged terminal dashpot 92 received by the bore 86. The relief valve is enlarged adjacent its other end, as at 93, with a frusto-conical valve face 94 being provided intermediate the enlarged portion 93 and the elongated portion 91 thereof. A terminal spring embossment 95 is provided at that end of the relief valve opposite the dash-pot 92, and this guide is received axially of an elongated coil compression spring 96 which is bottomed against an internal shoulder 97 formed on the bore 82. A relatively short relief passage 98 affords communication between the bore 82 and the other of the outlet passages 84a of the valve body 41.

Operation

As will be seen from Figures 2 and 3, the valve 40 is actually a double valve in that each of its parts, with the exception of the piston 46 and the piston chamber 42, is reproduced in mirror image on the other side of a center line. Inasmuch as all of the parts of this valve, with the exception of the valve case 41, are articles of rotation, the parts are identical.

For ease of understanding the operation of the valve of the present invention, let us assume that it is desired to actuate the sheave 24 in a clockwise direction as viewed in Figure 3 (counter-clockwise as viewed in Figure 2 because of crossing of the cables 22, 23), i.e., by actuation of the cylinder 21 to retract the piston 21a. Further, let us assume that the left hand elements of the valve 40 are connected to cylinder 21 through line 33.

The control valve 29 is moved vertically in the proper direction to introduce fluid under pressure through the line 31 into the valve 40. Thus, in order for the sheave 24 to turn in the direction indicated by the directional arrows of Figure 3, it is necessary to admit fluid pressure to the cylinder 21 and to provide for the egress of fluid from the cylinder 20. This is accomplished through the valve 40 in such a manner that both of the cables 22 and 23 are maintained in a taut condition, regardless of any tilting of the digger mechanism and/or regardless of any inertial loads placed upon the sheaves 24 by rotation of the digger elements or by gravity.

More specifically, fluid under pressure is admitted through the inlet passage 50 into the inlet chambers 43. In order for this pressure fluid to flow into the line 33 to the cylinder 21, it must pass from the inlet passage 43 into the outlet passage 44. Further, it will be noted that the diameter of the rear face of the poppet is the same as the diameter of the aperture 63 in the sleeve 60. Thus, both end faces of the poppet are subjected to the same pressure, and both end faces have the same effective area. Pressure in the inner chamber 43 places no unbalanced or differential pressure load upon the poppet 65, since the axial flow passage 69 thereof will admit this same pressure fluid to both the rear and forward faces thereof. Consequently, there is no pressure differential active upon the poppet because of fluid under pressure in the inlet passage 43.

There is a fluid pressure differential active upon the valve sleeve 60. This pressure acts upon the chamfered face 61 of the sleeve and opens the sleeve 60 to the left against the bias of the spring 77. This spring 77 is confined by the plug 70 and acts through the washer 78 on the poppet 65. The poppet in turn urges the valve sleeve to its seated position against the inlet seat insert 51. Thus, in net effect, the biasing force of the spring 77 is exerted upon the inlet sleeve. After the inlet is open, the fluid under pressure will flow through the line 81, the relief valve plug 85 (more accurately through the relief valve plug apertures 87) and the port 84 into the line 33. This pressure will then exert force on the cylinder and piston assembly 21 to urge the sheave in the indicated direction. However, the sheave cannot move so long as fluid is trapped in the forward end of the cylinder 20.

To relieve the pressure in the forward end of the cylinder 20 and to accommodate rotation of the sheave 24, the poppet valve 65a must be opened. During initial pressure flow through the left hand valve elements, there will be no appreciable pressure build-up within the inlet chamber 43 in excess of that necessary to open the inlet valve sleeve 60. However, upon filling the line, a substantially greater pressure will build up in the chamber 43, since the cylinder 21 cannot be actuated. This greater pressure operates upon the piston 46 and displaces the piston to the right until the piston rod 47a contacts the poppet 65a. The poppet 65a is displaced to the right against the compression of the spring 77a, thus opening a fluid flow passage interconnecting outlet passage 44a and inlet passage 43a.

The pressure required for opening the poppet 65a is independent of any back pressure which might exist within the port 81a because of attempted movement of the piston and cylinder assembly 20 and/or because of any inertial or gravitational loads placed upon the digger, as for example when it is operating upon a hillside.

To explain this absence of back pressure, it should be understood that the poppets 65 and 65a fit loosely within the corresponding sleeves 60 and 60a so that any pressure which is effective upon that portion of the chamfered noses 66 and 66a of the poppets radially outside the seat of the sleeves 60 and 60a, is also exerted upon the rear shoulders 68 and 68a of the poppets 65 and 65a, respectively. Thus, any back pressure existing within the port 81a will be vented through the plug apertures 76a and the inlet valve sleeve apertures 62a upon that portion of the chamfered poppet nose lying outwardly of the inlet valve sleeve seat 64a. However, this same pressure can leak between the poppet 65a and the surrounding sleeve 60a, so that this pressure also exists between the reduced portion 67a of the poppet and the surrounding chambers 72a. This pressure, thus is effective upon the shoulder 68a to urge the poppet to the left, i.e., against its seat 64a. Thus, the only force acting upon the poppet is that constant biasing force of the spring 77a and any back pressure effect is eliminated.

Once the poppet has been opened by actuation of the piston 46, a return fluid flow path from the cylinder 20 exists through line 32, port 84a, relief valve plug apertures 87a, port 81a, plug apertuers 76a, sleeve apertures 62a, sleeve seat opening 63a and the inlet seat inert 51a, and out through the inlet opening 50a to the valve 28 through line 30 and hence to the sump 26.

Thus, a complete actuating circuit has been established for both cylinders 20 and 21 and the sheave 24 will be rotated in the indicated direction. When the desired extent of actuation has been attained, the actuating handle for the valve 29 is neutralized, by a spring movement or manual movement, and fluid pressure ingress through the port 50 is interrupted. In the absence of fluid pressure within the chamber 43, the poppet 65 and the inlet valve sleeve 60 will be returned to their seated position of Figure 3, and all fluid pressure within the line 33 will cease, although the line will ordinarily remain full of hydraulic fluid. Further, in the absence of fluid pressure within the chamber 43, the piston centering spring 55a will, through washer 49a, move the piston 46 to its illustrated centered position, and the poppet spring 77a will return the poppet 65a to its seated position at the inlet valve seat 64a. The valve now occupies its illustrated position of Figure 3.

However, because of inertial forces existing within the system and the mass of the digger and any load within the digger bucket, there will be a tendency for the sheave 24 to continue rotation in the indicated direction. To damp this swinging movement, the internal circulation of hydraulic fluid is accommodated through the relief valves 90 and 90a.

Continued rotational movement of the sheave 24 will continue to generate pressure within the line 32, this pressure being truly back pressure, inasmuch as it is generated solely by tension within the cable 22 and not by any externally applied positive pressure within the cylinder 20. As heretofore explained, this back pressure will be ineffective to cause operation of the poppet 65a. However, this pressure will exist within the port 84a and within the bore 86a of the relief valve plug 85a. This pressure will be exerted upon the relief valve tapered face 94a and will urge the relief valve 90a to the left against the bias of the compression spring 96a. If the pressure within the line 84a and within the plug bore 86a is sufficient to open the relief valve 90a, this pressure fluid will be vented through the bore 82a and the bore port 98a into the line 84 for passage through this line into the fluid pressure line 33 of the cylinder 21, thus effecting slight additional movement of the cylinder 21 and substantially equalizing the pressures within the ports 84 and 84a. This greater relief valve opening pressure is necessary to prevent by-pass flow through the relief valve.

It will be noted that the valve 90a is provided with a dash-pot enlargement 92a. However, this dash-pot enlargement fits loosely within the plug bore 86a, so that any pressure within the bore 86a exists on both sides of the dash-pot projection. Thus, this dash-pot projection is equalized so far as pressure is concerned and exerts no effect upon opening and closing of the relief valve. However, the dash-pot projection 92a does prevent fluttering of the relief valve by damping its movement, inasmuch as oil flow through the restricted space between the periphery of the projection 92a and the inner periphery of the bore 86a is required to accommodate any movement of the relief valve.

It will be readily appreciated that actuation of the manual valve 29 in the opposite direction will merely reverse the entire operation heretofore described. In this event, pressure will enter the inlet opening 50a to actuate the inlet valve sleeve 60a to accommodate pressure flow to the cylinder 20. The piston 46 will be actuated to the left, opening the poppet 65 to accommodate return flow to the sump therethrough.

Thus it will be seen that the present invention provides a novel flow control cushioning valve wherein a pair of identical multi-component valves are utilized to control ingress and egress flow to a multi-component fluid pressure actuating system. The principle incorporated in this valve is readily applicable to multi-component systems, such as the utilization of a pair of single acting cylinders, as in the illustrated embodiment, the control of fluid pressure to and from the reverse sides of a double acting cylinder, the correlation of a pair of vane-type rotary hydraulic motors, or the like. Further, the accommodation of internal fluid flow by the novel relief valve arrangement removes any residual inertial or gravitational effect upon the system as a whole.

While preferred embodiments have been described above in detail, it will be understood that numerous modifications might be resorted to without departing from the scope of the invention as defined in the following claims.

What is claimed is:

1. In a two component hydraulic actuating device for driving a single means in reverse directions by the selective connection of a pair of hydraulic pressure chambers to a source of fluid under pressure and to a sump, respectively, a control valve comprising a pair of multi-part valves, each of said valves including an outer sleeve and an inner valve body, each of said sleeves having an exterior sealing surface and an interior seat and each of said bodies having a sealing surface cooperable with said interior seat, an actuating piston interposed between and abuttable with either of said bodies, a casing enclosing said valves and providing spaced valve recesses joined by a central piston bore receiving said piston, each of said valve recesses communicating with a first passage accommodating ingress fluid flow from the source and egress flow to a sump depending upon the direction of flow and each of said valve recesses also communicating with a second passage accommodating ingress fluid flow to and egress fluid flow from the pressure chambers of said device, said casing also having a valve seat in each of said recesses interposed between first and second passages and receiving said sleeve sealing surface thereagainst, and spring means biasing the sealing surfaces of each of said sleeves and each of said valve bodies against their respective seats, the ingress of fluid from said source into one of said recesses moving the associated sleeve sealing surface from its seat to admit fluid to the corresponding pressure chamber, and the resulting pressure in said recess actuating the piston to move the other valve body from its seat to accommodate egress flow from the other pressure chamber.

2. A flow control cushioning valve for use in two component systems comprising a casing having a pair of spaced valve recesses each of which communicates with an inlet opening and an outlet opening, means in each of said recesses defining a valve seat intermediate the corresponding inlet and outlet openings, a valve sleeve in each of said recesses having an exterior sealing surface cooperable with said seat to control the flow of fluid therethrough and an interior valve seat, a hydraulically balanced poppet disposed in each of said tubular bodies and cooperable with the interior valve seat thereof, said poppet being exposed to and balanced with respect to both inlet and outlet fluid pressure in the system, spring means biasing each of said bodies and each of said poppets into seating engagement with their respective seats, and extraneous hydraulic poppet-actuating means exposed to the system actuating pressure for opening the poppet controlling the other outlet.

3. A flow control valve for correlating the operation of two actuating components, comprising a casing having a pair of spaced valve recesses and a passage joining said recesses, means establishing communication between each of said recesses and a source of fluid under pressure and one of said components, respectively, means in each of said recesses defining a first valve seat operatively interposed between said source and the corresponding component, a first valve body in each of said recesses having a sealing surface engageable with the corresponding one of said first seats to prevent the flow of fluid therethrough to the corresponding actuating component and actuatable by pressure from said source out of engagement with said seat to accommodate fluid flow to the corresponding actuating component, each of said first valve bodies having a second valve seat, a second valve body cooperable with each of the second valve seats, means biasing each of said first and second bodies into seating engagement with their respective seats, and means disposed in said passage to be interposed between the recesses and responsive to the actuating pressure on one of said components when its corresponding first valve body is actuated from its seat to actuate the second valve body so as to accommodate the flow of fluid from the other of said components.

References Cited in the file of this patent

UNITED STATES PATENTS

| | | |
|---|---|---|
| 2,378,409 | Joy | June 19, 1945 |
| 2,558,520 | Halgren | Mar. 11, 1952 |
| 2,648,346 | Deardorff | Aug. 11, 1953 |
| 2,703,217 | Ashton | Mar. 1, 1955 |
| 2,720,755 | Gardiner | Oct. 18, 1955 |
| 2,783,020 | Klecek | Feb. 26, 1957 |

FOREIGN PATENTS

| | | |
|---|---|---|
| 401,823 | Italy | Feb. 6, 1943 |